United States Patent [19]

Burns

[11] Patent Number: 4,921,917

[45] Date of Patent: May 1, 1990

[54] PRE-CERAMIC METHYLPOLYSILANES

[75] Inventor: Gary T. Burns, Midland, Mich.

[73] Assignee: Dow Corning Corporation, Midland, Mich.

[21] Appl. No.: 103,275

[22] Filed: Oct. 1, 1987

[51] Int. Cl.$^5$ .......................................... C08F 283/00
[52] U.S. Cl. ..................................... 525/479; 528/25; 556/430
[58] Field of Search ................. 525/479, 474; 528/25; 556/430

[56] References Cited

U.S. PATENT DOCUMENTS

| | | |
|---|---|---|
| 3,746,732 | 7/1973 | Atwell et al. |
| 3,772,347 | 11/1973 | Atwell et al. |
| 3,878,234 | 4/1975 | Atwell et al. |
| 4,298,558 | 11/1981 | Baney et al. |
| 4,298,559 | 11/1981 | Baney et al. |
| 4,310,651 | 1/1982 | Baney et al. |
| 4,595,472 | 6/1986 | Haluska ........................ 528/25 |
| 4,639,501 | 1/1987 | Seyferth et al. ............. 528/15 |
| 4,719,273 | 1/1988 | Seyferth et al. ............. 528/15 |
| 4,737,552 | 4/1988 | Baney et al. ................. 525/479 |

FOREIGN PATENT DOCUMENTS 0122390 9/1981 Japan.
86/06074 10/1986 World Int. Prop. O.

OTHER PUBLICATIONS

Okinoshima et al., "Dichlorobis(Triethylphosphine)-Nickel(II) . . . ", *J. of the American Chemical Society*, 94, 9263-64, (1972).

Okinoshima et al., "A Novel Double Silylation . . . ", *Journal of Organometallic Chemistry*, 86, C27-C30, (1975).

Sakurai et al., "Novel [$\sigma+\pi$] Reactions of Hexaorganodisilanes . . . ", *Journal of the American Chemistry Society*, 97, 931-32, (1975).

Sakurai et al., "The Palladium Complex-Catalyzed Reactions of Hexorganodisilanes . . . ", *Chemistry Letters*, 887-90, (1975).

Tamao et al., "Fluorinated Polysilanes . . . ", *Journal of Organometallic Chemistry*, 114, C19-C21, (1976).

Tamao et al., "Fluorinated Polysilanes . . . ", *Journal of Organometallic Chemistry*, 146, 87-93, (1978).

Matsumoto et al., "Addition of Chlorodisilanes to Acetylene . . . ", *Journal of Organometallic Chemistry*, 199, 43-47, (1980).

Matsumoto et al., "Addition of Chlorodisilanes to 1,3-Butadienes . . . ", *Journal of Organometallic Chemistry*, 199, 185-93, (1980).

Watanabe et al., "Reaction of Disilanes with Acetylenes", *Journal of Organometallic Chemistry*, 186, 51-62, (1980).

Watanabe et al., "Double Silylation of Allene and Buta-1,2-Diene . . . ", *J. Chemical Society Chem. Communication*, 12, 617-18, (1981).

Watanabe et al., "Reaction of Disilanes with Acetylenes", *Journal of Organometallic Chemistry*, 216, 149-157, (1981).

*Primary Examiner*—Edward A. Miller
*Attorney, Agent, or Firm*—Marshall, O'Toole, Gerstein, Murray & Bicknell

[57] ABSTRACT

An improvement in pre-ceramic methylpolysilanes that utilizes the reaction of methylpolysilanes with multiple-unsaturated compounds to reduce the number of ternary and highly reduced silicon atoms in the polymer matrix. Polymers thus modified are generally easier to process into ceramic fibers than prior art methylpolysilanes.

21 Claims, No Drawings

PRE-CERAMIC METHYLPOLYSILANES

BACKGROUND OF THE INVENTION

The present invention relates generally to silicon carbide ceramic materials derived from silane polymers. More particularly, the present invention relates to new ceramic precursors that possess improved processing characteristics over generally similar, prior art, pre-ceramic polymers.

Considerable research is currently ongoing throughout the world on developing methods of producing silicon carbide ceramic fibers. Such fibers are unusually well suited for myriad potential applications where ceramic materials' characteristic properties, which include high strength, light weight and stability at high temperatures, are essential.

Since silicon carbide is brittle, and thus is generally unsuited to be formed into fibers, researchers have prepared silicon carbide fibers indirectly from polysilanes. For example, Baney et al., U.S. Pat. No. 4,310,651 ('651) discloses the synthesis of polysilane polymers, especially methylpolysilanes, that could be formed into fibers and then pyrolyzed, giving ceramic fibers. Unfortunately, these polymers are often difficult to process, having poor rheological characteristics and a tendency to burn spontaneously in air during spinning or other processing operations. Such difficulty in processing is a significant obstacle to using polysilane polymers as a route for the manufacture of silicon carbide fibers.

Work subsequent to Baney et al. '651 has sought to improve the processability of these polysilane polymers by modifying the basic polymer with various substituents. For example, Baney et al., U.S. Pat. No. 4,298,559, sought to make the polymers easier to handle by adding alkyl or aryl substituents via a grignard reaction. Seyferth et al., U.S. Pat. No. 4,639,501 discloses modifying another type of polysilane polymer via hydrosilylation reactions with organic or organosilicon compounds containing two or more alkenyl groups. Although the primary objective of Seyferth et al. appears to be to increase the yield of the final ceramic, another stated objective is to obtain a polymer that is stable at room temperature.

Although these prior efforts to improve polysilane polymers may improve certain characteristics of the polymer, they do not remedy what appears to be a major cause of the polymer's instability, i.e., the presence of a number of branching sites in the polymer backbone. The high degree of branching—which may lead to the formation of small, highly strained ring structures—seems to reduce the oxidative stability of the polymer, and probably also contributes to a rigidity in the polymer matrix that can result in poor rheology. Accordingly, it is desirable to chemically modify the polymer such that the polymer's oxidative instability relating to the branching sites and ring strain can be reduced without diluting the desirable characteristics of the silicon carbide end-product that make ceramic fibers so attractive.

SUMMARY OF THE INVENTION

The present invention centers on the dual discovery that the presence of a large number of branches in the polysilane backbone of methylpolysilanes is a root cause of the polymer's oxidative instability, and that the insertion of multiple-unsaturated compounds into the polymer will remedy that cause of instability. Such multiple unsaturated compounds are exemplified by acetylene or phenylacetylene, but dienes and other compounds containing more unsaturation than simply one carbon-carbon double bond are included within the scope of this invention.

In addition to greater stability, methylpolysilanes modified in accordance with the present invention generally possess improved processing characteristics. Most significantly, polymers modified in accordance with the present invention exhibit dramatically altered rheology. The insertion reactions with the multiple unsaturated compounds also create cross-linking sites in the polymer that permit oxidative or free-radical cures. Selective introduction of functionality to control the silicon:carbon stoichiometry of the ceramic is also facilitated.

Other features and advantages are inherent in the method claimed and disclosed or will become apparent to those skilled in the art from the following detailed description.

DETAILED DESCRIPTION OF THE INVENTION

The invention disclosed herein utilizes a known reaction of disilane monomers to improve the characteristics of silane polymers. It has been previously reported that multiple-unsaturated compounds such as acetylene can enter into insertion reactions between the silicon atoms of disilane compounds. This invention applies these basic reactions to a different environment, one in which silicon-silicon bonds are entrapped in the matrix of a polysilane polymer such as methylpolysilane. Surprisingly, the insertion reactions proceed readily with methylpolysilanes in spite of the potential steric hindrances to such reactions.

As used herein, the term "methylpolysilanes" refers to polymers disclosed by Baney et al. in U.S. Pat. No. 4,310,651 and described therein as well as polymers which are obvious equivalents. For example, it would be within the scope of this invention to substitute another alkyl group or groups for some or all of the methyl groups, so long as the alkyl groups chosen do not so increase steric hindrances as to interfere with the insertion reaction. Likewise, another hydrolyzable group such as alkoxy may be substituted for the chlorine in the polysilane polymer disclosed in Baney et al. '651. Indeed, the invention is probably of most benefit when it is used with the methoxy derivative of methylpolysilane disclosed in Baney et al. U.S. Pat. No. 4,298,558. The term "methylpolysilanes" as used herein also refers to modified versions of the basic polymer, as disclosed in Baney et al. '651, including modifications such as that disclosed in Baney et al. U.S. Pat. No. 4,298,559, which is discussed above.

The term "multiple-unsaturated compound" refers to alkynes, dienes and other compounds containing more unsaturation than that imparted by a single carbon-carbon double bond. Included within this category are alkynes, dienes, enones, enynes and any other compounds containing two or more chemical bonds resulting from the non-aromatic interaction of $\pi$ molecular orbitals. As used herein, the term "non-aromatic" is meant to exclude compounds such as benzene where the $\pi$ molecular orbitals are entirely contained in the aromatic ring, but does not exclude compounds such as phenylacetylene where unsaturation is present apart from the aromatic ring.

The insertion reaction is catalyzed by phosphine complexes of transition metals. Transition metal catalysts such as tetrakis(triphenylphosphine)palladium, bis(triphenylphosphine)palladium dichloride, tetrakis(triphenylphosphine)-platinum, and bis(triethylphosphine)nickel dichloride have been shown in the prior art literature mentioned above to catalyze insertion reactions with disilane monomers. The work described in more detail below has demonstrated that tris(triphenylphosphine)rhodium chloride as well as tetrakis(triphenylphosphine)palladium are effective insertion catalysts for methylpolysilanes. Any catalyst which has been shown to catalyze insertion reactions between silicon-silicon bonds in monomeric species with multiple-unsaturated compounds is potentially useful for the present invention.

In addition to catalyzing insertion of the unsaturated moiety, such catalysts also appear to catalyze silicon-silicon bond redistribution. Such redistribution probably contributes to the stability observed in methylpolysilanes that have undergone the insertion reaction, although the magnitude of the redistribution's effect is uncertain.

After undergoing the insertion reaction, the now modified methylpolysilanes possess improved oxidative stability as compared to the parent methylpolysilane. If too much unsaturation is introduced into the polymer, however, this improvement in the polymer's stability may be outweighed by a deleterious effect on the ceramic endproduct's oxidative stability. For example, if as much as 28 wt. % of phenylacetylene is incorporated into the polymer, the ceramic end-product is completely oxidized after 12 hours of heating in air at 1200° C. Accordingly, in those applications where the oxidative stability of the ceramic needs to be maximized, the amount of unsaturation introduced should be limited in accordance with the present invention to that which is necessary to have beneficial effects on the properties of the polymer.

In addition to improving the oxidative stability of the pre-ceramic polymer, the insertion reaction also dramatically alters the polymer's rheology. This change in rheology usually results in an improvement in the spinning ability of the polymer, although there is at least one instance where the spinning characteristics of the polymer were adversely affected.

The methylpolysilanes modified by the method of this invention are also useful as binders or sintering agents for the preparation of composite articles. For example, the methylpolysilanes can be used with silicon carbide powder or fibers using known procedures to prepare articles of desired configuration.

The methoxy derivatives of methylpolysilanes (see Baney et al. U.S. Pat. No. 4,298,558) are especially well-suited for undergoing insertion reactions with multiple unsaturated compounds. Three of four tested polymer preparations of the methoxy derivative could not be successfully melt spun into fibers. After undergoing the insertion reaction with acetylene, however, all were easily melt spun. Significantly, this improvement in rheology can be accomplished without a notably adverse effect on the oxidative stability of the ceramic end-product produced by pyrolysis of the methoxy derivative of methylpolysilane.

In addition to improving the methylpolysilanes' oxidative stability, the insertion of as little as 4.6 wt. % of a multiple-unsaturated compound can impart the additional benefit of introducing cross-linking sites into the polymer. These sites permit curing of the polymer via an oxidative or free radical mechanism. The former cure is obtained by heating the polymer in the presence of air. The latter has been achieved by exposure of the modified methylpolysilane to ultraviolet light, although other sources of free radical initiation will be obvious to those skilled in the art. Curing could not be introduced by exposure to electron beams, however.

The insertion reaction also provides a convenient method for controlling the silicon:carbon stoichiometry of the ceramic precursor. From the standpoint of the ceramic's oxidative stability, the optimal silicon:carbon weight ratio for a silicon carbide ceramic is about 30% C:70% Si. Unmodified methylpolysilanes tend to give silicon-rich chars, i.e., ceramics containing more than the optimal amount of silicon. The insertion of unsaturated moieties increases the carbon content both of the polymer and of the final ceramic, thus permitting optimization of the ceramic's stoichiometry. Moreover, in those applications where a small amount of excess carbon is desirable, the present invention represents a convenient method of increasing the carbon content by a controlled amount.

The present invention also raises the possibility that certain pre-ceramic polymers that have heretofore eluded synthesis may now be within reach. The present invention demonstrates that insertion of unsaturated moieties into silicon-silicon bonds is now possible within a polymer, so that new classes of carbosilanes may now be available, i.e., carbosilanes comprised of regular alternating units of silicon and an unsaturated moiety. For example, an insertion reaction involving 1,3-butadiene and linear polysilane should produce the following pre-ceramic polymer:

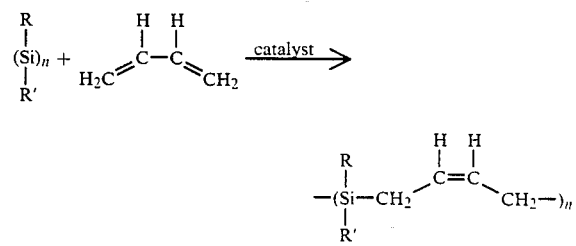

In the following examples the abbreviation "MPS" refers to the methylpolysilanes developed by Baney et al., as disclosed in U.S. Pat. Nos. 4,310,651, 4,298,558 and 4,298,559, which are hereby incorporated by reference to further describe the methylpolysilane polymers. The number "250" refers to the temperature in degrees centigrade to which the polymerization reaction was taken to synthesize the methylpolysilane. The "Cl" and "OMe" refer to the hydrolyzable group present in the methylpolysilane, i.e., chloride and methoxy respectively.

Reaction of MPS-250-OMe with Phenylacetylene (8.2 wt %)

A three-neck, 250 ml round bottom flask fitted with a mechanical stirrer, a septum, and a reflux condensor with a gas inlet was sequentially charged with 13.577 g of MPS-250-OMe (SiMe:SiOMe ratio of 36:1), 1.209 g of phenylacetylene, 82 mg of $(Ph_3P)_4$ Pd and 60 ml of toluene. After refluxing for 22 hours, analysis of the reaction mixture by gas chromatography indicated that ≥90% of the phenylacetylene had been consumed. The solution was filtered through a medium glass frit. Removal of the solvent from the filtrate afforded 12.85 g of a brittle, orange polymer (86.4% mass recovery).

Reaction of MPS-250-Cl with Acetylene

A three-neck, 250 mL round bottom flask fitted with a mechanical stirrer, a gas inlet tube and a reflux condensor with a nitrogen inlet was sequentially charged with 25.04 g of MPS-250-Cl, 0.327 g of (Ph₃P)₄Pd and 125 ml of toluene. Acetylene was bubbled rapidly through the solution for 5 ½ hours at reflux. After filtration through a medium glass frit and removal of the solvent, 23.3 g of an orange, brittle polymer was obtained (91.7% mass recovery).

Reaction of MPS-250-OMe with Acetylene

A three-neck, 250 mL round bottom flask fitted with a septum, a gas inlet, and a reflux condensor with a gas outlet was sequentially charged with 18.0 g of MPS-250-OMe (SiMe:SiOMe ratio of 36:1), 0.498 g of (Ph₃P)₄Pd and 65 ml of toluene. Acetylene was bubbled rapidly through a refluxing solution for 6 ½ hours. After filtration and removal of solvent, 17.84 g of a light orange-red polymer was obtained. The SiMe:SiOMe:vinyl ratio was 55.2:1:3 as determined by 1H NMR analysis.

Reaction of MPS-250-OMe With Phenylacetylene (4.6 wt. %) Both In The Absence and Presence of (Ph₃P)₄Pd A 250 mL three-neck round bottom flask fitted with a stirring bar, two septums and a reflux condenser with a gas inlet was charged with 1.209 g (.0118 mole) of phenylacetylene, 25.0 g of MPS-250-OMe (SiMe:SiOMe ratio of 4.2:1), and ~80 ml of toluene. The solution was refluxed for 4 ½ hours under an argon atmosphere with occasional monitoring by Gas Chromatography (GC). No change in the phenylacetylene concentration was observed (by GC) during this time period. One hundred mg of (Ph₃P)₄Pd in 20 ml of toluene was then added. A GC trace taken 30 minutes after the addition showed a marked decrease in the phenylacetylene concentration. The reaction was refluxed overnight, cooled to room temperature, filtered through a medium glass frit and the filtrate concentrated in vacuo to afford a red brittle polymer (24.20 g, 92% mass recovery).

Reaction of MPS-250-OMe With Phenylacetylene (8.5 wt %) In The Presence of (Ph₃P)₃RhCl A three-neck 100 ml round bottom flask fitted with a reflux condensor with a gas inlet, two septums and a stirring bar was charged with 5.0 g of MPS-250-OMe (SiMe:SiOMe ratio of 4.2:1), 40 ml of toluene, 60 mg ($6.5 \times 10^{-5}$ mole) of (Ph₃P)₃RhCl and 0.465 g (0.455 mole) of phenylacetylene. The reaction was refluxed for four hours under an argon atmosphere. After 43 minutes, 73% of the phenylacetylene was consumed (by GC analysis). After cooling to room temperature, the solution was filtered and the filtrate concentrated to afford a brittle, red polymer.

Tabulated below are data reflecting the properties of these substituted methylpolysilanes.

TABLE I

| Compound | ELEMENTAL ANALYSIS | | | | | | | | | | |
|---|---|---|---|---|---|---|---|---|---|---|---|
| | Polymer Analysis | | | | 1200° C. (argon)[a] Ceramic Analysis | | | 1200° C.[b] (Air) | 1550° C.(argon)[c] Ceramic Analysis | | |
| | C | H | Si | Cl | C | Si | O | O | C | Si | O |
| MPS-250-OMe | | | | | | | | | | | |
| A | 28.5 | 7.28 | 49.4 | 8.68 | 25.3 | 56.5 | 4.79 | 6.74 | — | — | — |
| B | — | — | — | — | — | — | — | 2.46 | 19–26 | 70.5 | 0.28 |
| C | 24.0 | 6.38 | 40.6 | 2.13 | — | — | — | — | — | — | — |
| D | 29.8 | 7.28 | 47.9 | 4.0 | 22.9 | 62.5 | 8.6 | 9.5 | 27.0 | 70.1 | 0.52 |
| MPS-250-Cl | | | | | | | | | | | |
| A | 23.0 | 6.18 | 42.9 | — | 23.6 | 56 | 0.38 | 1.54 | 28.6 | 69.5 | 0.23 |
| B | 21.2 | 4.96 | 44.0 | 15.09 | 25.5 | 72.0 | 0.52 | 2.47 | 29.6 | 71.2 | 0.52 |
| (MPS-250-Cl + 28 wt % Ph—≡—H) | 44.6 | 6.04 | 32.0 | 15.1 | 35.2 | 33.8[d] | 3.61 | 52.0 | 37.8 | 51.4 | 0.28 |
| (MPS-250-OMe + 28 wt % Ph—≡—H) | 46 | 5.92 | 29.8 | — | 39.7 | 39.6[d] | 5.74 | 51.9 | 41.8 | 50.8 | 0.28 |
| (MPS-250-OMe + 8.2 wt % Ph—≡—H) | 31.2 | 6.62 | 38.8 | — | 28.6 | 57.7 | 4.31 | 7.19 | 31.3 | 67 | 0.27 |
| (MPS-250-Cl + H—≡—H) | 25.4 | 6.17 | 40.6 | 17.6 | 27.1 | 66.8 | 2.47 | 6.15 | 29.2 | 69.9 | 0.65 |
| (MPS-250-OMe + H—≡—H) | — | — | — | — | 25.4 | 59.2 | 4.39 | 11.0 | 28.9 | 68.6 | 0.20 |
| (MPS-250-OMe + 4.6 wt % Ph—≡—H) | — | — | — | — | 28.6 | 62.2 | 5.68 | 6.60 | 27.9 | 69.3 | 2.17 |

[a]Polymers were heated from room temperature to 1200° C. over a ~110 minute interval and then held at 1200° C. for 15–35 minutes under an argon atmosphere.
[b]The ceramics were heated from room temperature to 1200° C. at 5° C./minute and then held at 1200° C. for 12 hours. A purge of purified air was used.
[c]The ceramics were fired at 1550° C. for 2 hours under an argon atmosphere.
[d]The silicon analysis is in obvious error.

TABLE 2

SPINNING TEMPERATURE OF MPS-POLYMERS

| Sample | Softening Point (°C.) | Spinning Head Temperature °C. |
|---|---|---|
| MPS-250-OMe (Samples A–C) | — | Extruded |
| MPS-250-OMe (Sample D) | — | 130–132° |
| MPS-250-Cl (Sample A) | — | 170–185° |
| MPS-250-Cl (Sample B) | 71.8[a] | — |
| MPS-250-OMe + Ph—≡—H (28 wt %) | 77.9[b] | 125–130° |
| MPS-250-Cl + Ph—≡—H (28 wt %) | 61.3[b] | 120–122° |
| MPS-250-OMe + H—≡—H | 138[a] | 148–151° |
| MPS-250-Cl + H—≡—H | 118.9[a] | Extruded |
| MPS-250-OMe + Ph—≡—H (8.2 wt %) | — | 190–192° |

[a]Glass Transition Temperature (Tg)
[b]Softening Temperature (Ts)

TABLE 3

CURE STUDIES OF MPS POLYMERS

| Sample | Air Cure (wt. % 0)[c] | hv[a] (wt. % 0)[c] | e beam[b] |
|---|---|---|---|
| MPS-250-OMe (Sample A) | Cured-exposed | — | — |

TABLE 3-continued
CURE STUDIES OF MPS POLYMERS

| Sample | Air Cure (wt. % 0)[c] | hv[a] (wt. % 0)[c] | e beam[b] |
|---|---|---|---|
| MPS-250-OMe (Sample D) | 2 days room temp (28.0%) Cured-exposed 2 hours room temp (9.6%) | Uncured | — |
| MPS-250-Cl (Sample A) | Cured after 3-4 days exposed 17 days room temp (17.0%) | Uncured | Uncured |
| MPS-250-OMe + Ph—≡—H (28 wt %) | Cured-exposed 17 days room temp (17.0%) | Part. Cured (11.2%) | Uncured |
| MPS-250-Cl + Ph—≡—H (28 wt %) | Cured-exposed 17 days room temp (23.4%) | Uncured | Uncured |
| MPS-250-OMe + H—≡—H | Cured-exposed 22 hours room temp (11.7%) | Cured (9.8%) | — |
| MPS-250-Cl + H—≡—H | Cured-exposed 22 hours room temp (11.6%) | — | — |
| MPS-250-OMe + Ph—≡—H (8.2 wt %) | Cured-exposed 22 hours room temp (9.6%) | Cured (5.8%) | — |

[a] Samples were irradiated for 70 minutes through quartz tube ($N_2$ atmosphere) with a 450 W medium pressure Hanovia lamp.
[b] Samples were subjected to a total of 50 megarads under $N_2$.
[c] After firing to 1200° C. in argon.

TABLE 4
CHAR YIELDS OF CURED FIBERS

| Sample | Air Cured (%) | hv Cured* (%) |
|---|---|---|
| MPS-250-OMe | 84.2 (bulk) | — |
| MPS-250-OMe (Sample D) | 69.4 | Uncured (55.4) |
| MPS-250-Cl (Sample A) | 79 | Uncured |
| MPS-250-OMe + Ph—≡—H (28 wt %) | 73.6 | 37 |
| MPS-250-Cl + Ph—≡—H (28 wt %) | 73.3 | Uncured |
| MPS-250-OMe + H—≡—H | 66.3 | 61.4 |
| MPS-250-Cl + H—≡—H | 62.5 | — |
| MPS-250-OMe + Ph—≡—H (8.2 wt %) | 72 | 61.7 |

*Sample sizes ranged from 44-115 mg.

TABLE 5
POLYMER AND CERAMIC WEIGHT RETENTION

| Sample | % Wt. Retention in Argon (1200° C.)[a] | % Wt. Change in Air (1200° C.)[b] | % Wt. Retention in Argon (1550° C.)[c] |
|---|---|---|---|
| MPS-250-OMe (Sample A) | 58.4 | +2.2 | 95.9 |
| MPS-250-OMe (Sample B) | 46.5 | +0.2 | 90.6 |
| MPS-250-OMe (Sample D) | 63.2 | +1.0 | 79.6 |
| MPS-250-Cl (Sample A) | 44 | +0.0 | 97.2 |
| MPS-250-Cl (Sample B) | 43 | +5.2 | 98.2 |
| MPS-250-Cl + Ph—≡—H (28 wt %) | 46 | +4.6 | 92.7 |
| MPS-250-OMe + Ph—≡—H (28 wt %) | 51 | +3.7 | 90.5 |
| MPS-250-OMe + Ph—≡—H (8.2 wt %) | 66 | +2.4 | 87.8 |
| MPS-250-Cl + H—≡—H | 52 | +2.9 | 84.2 |
| MPS-250-OMe + H—≡—H | 58 | +0.3 | 89.6 |
| MPS-250-OMe + Ph—≡—H (4.6 wt %) | 65.1 | +0.4 | 87.5 |

[a] Polymers were heated from room temperature to 1200° C. over a ~110 minute inteval and then held at 1200° C. for 15-35 minutes under an argon atmosphere.
The ceramics were heated from room temperature to 1200° C. at 5° C./minute and then held at 1200° C. for 12 hours. A purge of purified air was used.
[c] The ceramics were fired at 1550° C. for 2 hours under an argon atmosphere.

Much of what has been described above concerning the properties of the modified methylpolysilanes of the present invention can be gleaned from the tabulated data. For three of the four samples of methoxy-substituted methylpolysilanes, the insertion reaction facilitated spinning of the polymer into fibers (See Table 2). With the insertion of the unsaturated moiety, curing of the polymer is possible either by exposure to air or irradiation (See Table 3), and the cured polymers give good yields as ceramic fibers (Table 4). The addition of the unsaturation increases the carbon content and can bring the ceramic closer to the desired stoichiometry (See Table 1). Finally, so long as the amount of the added unsaturation is controlled, the oxidative stability of the final ceramic is not significantly affected (See Tables 1 and 5).

The foregoing detailed description has been given for clearness of understanding only, and no unnecessary limitations should be understood therefrom, as modification will be obvious to those skilled in the art.

I claim:
1. A method for improving the properties of methylpolysilanes useful in the production of silicon carbide ceramics, said method comprising the steps of:
   providing a solution of at least one methylpolysilane polymer having silicon-silicon bonds;
   inserting an unsaturated moiety into silicon-silicon bonds present in said methylpolysilane polymer by reacting said methylpolysilane polymer, in the presence of a catalyst, with at least one multiple-unsaturated compound which is capable of entering into insertion reactions with disilane monomers; and isolating the reaction product.

2. The method recited in claim 1 wherein said methylpolysilane contains at least one hydrolyzable group.

3. The method recited in claim 2 wherein said hydrolyzable group is chlorine.

4. The method recited in claim 2 wherein said hydrolyzable group is methoxy.

5. The method recited in claim 1 wherein said multiple-unsaturated compound is a diene.

6. The method recited in claim 5 wherein said diene is conjugated.

7. The method recited in claim 1 wherein said multiple-unsaturated compound is an alkyne.

8. The method recited in claim 7 wherein said multiple unsaturated compound is at least one of a group consisting of acetylene and substituted acetylene.

9. The method recited in claim 8 wherein the substituent in said substituted acetylene is at least one of the group consisting of phenyl and substituted phenyl.

10. The method recited in claim 1 wherein said multiple-unsaturated compound contains both a double bond between carbon atoms and a double bond between carbon and an atom other than carbon.

11. The method recited in claim 10 wherein said multiple-unsaturated compound is an enone.

12. The method recited in claim 1 wherein said catalyst is tetrakis(triphenylphosphine)palladium.

13. The method recited in claim 1 wherein said catalyst is tris(triphenylphosphine)rhodium chloride.

14. A methylpolysilane polymer useful in the production of silicon carbide ceramics, said polymer being produced by the method comprising the steps of:

providing a solution of at least one methylpolysilane polymer having silicon-silicon bonds;

inserting an unsaturated moiety into silicon-silicon bonds present in said methylpolysilane polymer by reacting said methylpolysilane polymer, in the presence of a catalyst, with at least one multiple-unsaturated compound which is capable of entering into an insertion reaction with disilane monomers; and isolating the reaction product.

15. A methylpolysilane polymer as recited in claim 14 wherein said multiple-unsaturated compound is at least one of a group consisting of alkyne and substituted alkyne.

16. A methylpolysilane polymer as recited in claim 15 wherein said alkyne is acetylene.

17. A methylpolysilane polymer as recited in claim 15 wherein a substituent in said substituted alkyne is at least one of a group consisting of phenyl and substituted phenyl.

18. A methylpolysilane polymer as recited in claim 14 and having substantially improved oxidative stability as compared to a methylpolysilane prior to reacting with said multiple-unsaturated compound.

19. A methylpolysilane polymer as recited in claim 14 and possessing cross-linking sites that permit non-oxidative cures of the methylpolysilane polymer.

20. A methylpolysilane polymer as recited in claim 14 and having improved rheology as compared to a methylpolysilane prior to reacting with said multiple-unsaturated compound.

21. A methylpolysilane polymer as recited in claim 14 and which provides better control of the stoichiometric ratio of silicon:carbon in a silicon carbide ceramic as compared to a methylpolysilane prior to reacting with said multiple-unsaturated compound.

* * * * *